No. 860,283. PATENTED JULY 16, 1907.
H. DANIEL.
CHECK VALVE.
APPLICATION FILED JAN. 16, 1906.
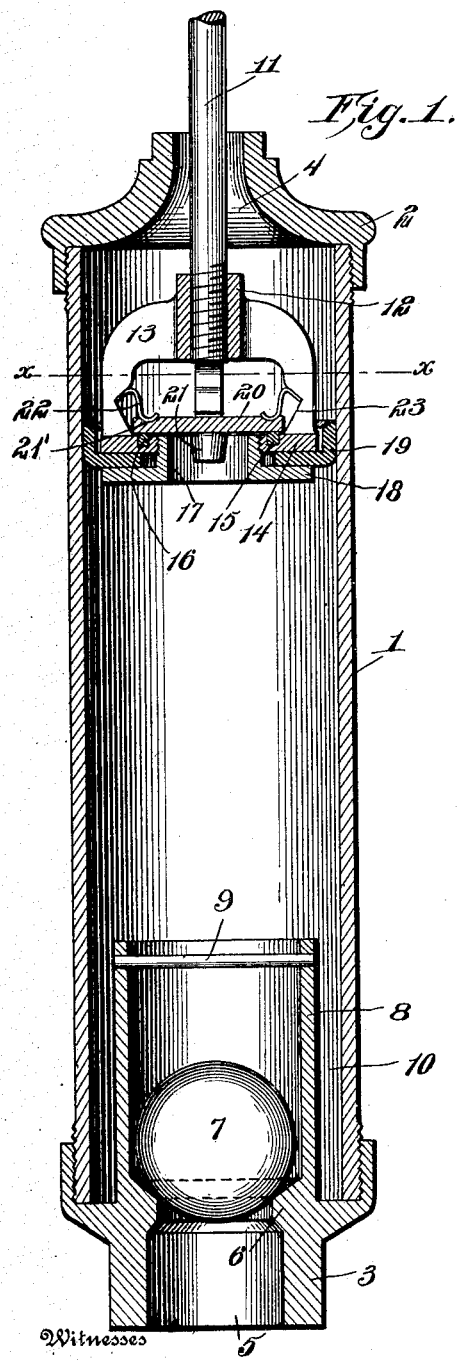
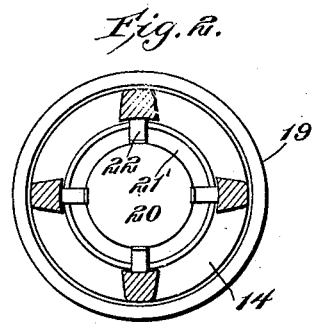
Inventor
Henry Daniel

UNITED STATES PATENT OFFICE.

HENRY DANIEL, OF CROFTON, MICHIGAN.

CHECK-VALVE.

No. 860,283.  Specification of Letters Patent.  Patented July 16, 1907.

Application filed January 16, 1906. Serial No. 296,295.

*To all whom it may concern:*

Be it known that I, HENRY DANIEL, a citizen of the United States, residing at Crofton, in the county of Kalkaska and State of Michigan, have invented certain new and useful Improvements in Check-Valves; and I do hereby declare the following to be a full, clear, and exact description of the invention, such as will enable others skilled in the art to which it appertains to make and use the same.

My invention relates to pumps and more particularly in improvements in the valves whereby water can be easily hoisted, there being no parts in the valves which are liable to get out of order and interfere with their proper operation.

The invention consists of a check valve in the form of a ball which is normally seated by gravity and which is surrounded by a sleeve which prevents displacement of the ball. A lift valve is connected to the pump rod and consists of a head which is connected by yokes to the rod and interposed between the yokes is a plate which is normally seated over the aperture formed within the head. Springs may be utilized for assisting gravity for automatically seating the plate and for preventing displacement thereof.

The invention also consists of the further novel features of construction and combination of parts, the preferred form whereof will be hereinafter made clearly apparent and pointed out in the claims. In the accompanying drawings I have shown the preferred form of my invention.

In said drawings—Figure 1 is a section through the pump cylinder and showing my valves in position therein, and, Fig. 2 is a section through the lift valve on the line $x$—$x$ Fig. 1.

Referring to the figures by numerals of reference, 1 is a cylinder having heads 2 and 3 secured to the ends thereof, each head having a passage 4 and 5, respectively. The passage 5 has an internal shoulder 6 which constitutes a seat for a ball 7 formed of rubber or other desired material and extending upward from the head 3 and surrounding the seat is a cylindrical sleeve 8, the internal diameter of which is somewhat greater than the diameter of the ball 7. This sleeve may project into the cylinder 1 any desired distance and has a retaining pin 9 extending thereacross at its inner end so as to prevent the ball 7 from leaving the sleeve.

A circular recess or trap 10 is formed around the sleeve 8 for the reception of any sediment which may accumulate within the cylinder, said sediment being therefore held away from the seat 6 so as not to interfere with the proper seating of the ball 7.

The pump rod 11 extends through the passage 4 in head 2 and its lower threaded end projects into a sleeve 12 from which extends a suitable number of angular arms or yokes 13 which are formed integral with a ring 14 having a circular groove 15 in its upper face in which is disposed a packing ring 16. The opening through the ring has its walls screw threaded to receive a tubular extension 17 formed around the opening of a ring 18, and a washer 19 of leather or other suitable material is interposed between the rings 18 and 14 and by rotating the ring 18, this extension 17 will screw into the ring 14 so that the washer 19 will be firmly clamped in position. The head constituted by the two rings 14 and 18 and washer 19 supports a disk 20 having a depending lug 21 which projects into the extension 17 and serves to prevent lateral displacement of the disk. This disk has a circular groove 21' within it into which projects spring fingers 22 which are suitably secured in recesses 23 formed in the inner faces of the yokes 13.

It will be obvious that when the lift valve, which is formed of the rings 14 and 18 and the disk 20, is raised, water will be sucked through the passage 5 and sleeve 8 and into cylinder 1, said action causing the ball 7 to be unseated. During the reverse movement of the lift valve, the ball 7 will be seated so as to prevent the return of the water drawn into the cylinder 1 and this water will force the disk 20 upward and flow through the rings into that portion of the cylinder above the lift valve. When the lift valve again moves upward, the disk 20 will be seated by gravity assisted by the springs 22 and the weight of the water above the valve, and therefore all water above said valve will be forced out through said passage 4.

What I claim is:—

1. The herein described piston, comprising a ring, yokes integral with said ring, a disk seated upon the ring and normally closing the opening therein, said ring having a circular groove, spring fingers extending from the yokes and seated in the groove, and means to reciprocate said piston.

2. The herein described piston comprising a ring, a plurality of yokes integral with said ring, a disk seated upon the ring and normally closing the opening therein, said disk having a circular groove, spring fingers extending from the yokes and seated in the groove, a flexible washer extending beyond the periphery of the ring, adjustable means for clamping the washer to the ring and additional means engaging the upper ends of said yokes adapted to operate said piston.

3. The herein described piston comprising a ring having a threaded aperture therethrough, a plurality of yokes integral with and extending upwardly from said ring, a second ring, a threaded extension thereon engaging the walls of the threaded aperture, a flexible washer interposed between the ring and extending therefrom, a grooved disk normally seated upon the rings and closing the aperture therein, a lug depending from the disk and within the aperture, spring fingers extending from the yokes and seated within the groove in the disk and means to operate said piston.

In testimony whereof I have signed my name to this specification in the presence of two subscribing witnesses.

HENRY DANIEL.

Witnesses:
 MILLES HOBBS,
 ANGUS MORRISON.